United States Patent
Liu et al.

(10) Patent No.: US 9,743,423 B2
(45) Date of Patent: Aug. 22, 2017

(54) LINK ADAPTATION IN GRANT-FREE MULTIPLE ACCESS SYSTEMS

(71) Applicant: Futurewei Technologies, Inc., Plano, TX (US)

(72) Inventors: Bin Liu, Plano, TX (US); Richard Stirling-Gallacher, Plano, TX (US); Jian Wang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 73 days.

(21) Appl. No.: 14/810,119

(22) Filed: Jul. 27, 2015

(65) Prior Publication Data

US 2017/0034845 A1    Feb. 2, 2017

(51) Int. Cl.
| | |
|---|---|
| *H04W 72/14* | (2009.01) |
| *H04W 72/12* | (2009.01) |
| *H04L 1/00* | (2006.01) |
| *H04W 24/08* | (2009.01) |
| *H04W 28/02* | (2009.01) |

(Continued)

(52) U.S. Cl.
CPC ....... *H04W 72/1268* (2013.01); *H04L 1/0003* (2013.01); *H04W 24/08* (2013.01); *H04W 28/0289* (2013.01); *H04W 72/14* (2013.01); *H04W 74/0833* (2013.01); *H04W 74/04* (2013.01)

(58) Field of Classification Search
None
See application file for complete search history.

(56) References Cited

U.S. PATENT DOCUMENTS

| | | | |
|---|---|---|---|
| 2001/0043613 A1 | 11/2001 | Wibowo et al. | |
| 2009/0103558 A1* | 4/2009 | Zangi | H04W 74/0841 370/447 |

(Continued)

FOREIGN PATENT DOCUMENTS

| | | |
|---|---|---|
| CN | 101345906 A | 1/2009 |
| WO | WO2014/082591 A1 | 6/2014 |

(Continued)

OTHER PUBLICATIONS

Au, Kevin, et al., "Uplink Contention Based SCMA for 5G Radio Access," Globecom Workshops, Dec. 2014, 6 pages.

(Continued)

*Primary Examiner* — Steven H Nguyen
(74) *Attorney, Agent, or Firm* — Futurewei Technologies, Inc.

(57) ABSTRACT

A BS determines an amount of resource overloading for a contention transmission unit (CTU) access region associated with a grant-free uplink transmission scheme in a multiple access system. The BS determines a modulation and coding scheme (MCS) limit indicating a maximum MCS level for the CTU access region. The BS sends the MCS limit to a plurality of user equipments (UEs) associated with the first CTU access region. A UE receives from the base station the MCS limit and determines a first MCS index within the MCS limit for a first uplink transmission. The UE sends the first uplink transmission to the base station using a CTU in the CTU access region. The first uplink transmission includes user data and the first MCS index determined at the first UE.

28 Claims, 12 Drawing Sheets

(51) Int. Cl.
*H04W 74/08* (2009.01)
*H04W 74/04* (2009.01)

(56) References Cited

U.S. PATENT DOCUMENTS

| | | | | |
|---|---|---|---|---|
| 2011/0039568 A1* | 2/2011 | Zhang | ................... | H04W 52/50 |
| | | | | 455/452.1 |
| 2012/0014269 A1* | 1/2012 | Ray | ..................... | H04W 74/006 |
| | | | | 370/252 |
| 2014/0254544 A1* | 9/2014 | Kar Kin Au | .......... | H04L 5/0033 |
| | | | | 370/330 |
| 2016/0174122 A1* | 6/2016 | Sorrentino | ........... | H04B 1/3822 |
| | | | | 370/331 |

FOREIGN PATENT DOCUMENTS

| | | |
|---|---|---|
| WO | WO2014/135126 A1 | 9/2014 |
| WO | WO2015/021239 A1 | 2/2015 |

OTHER PUBLICATIONS

Nikopour, Hosein, et al., "Sparse Code Multiple Access," IEEE 24th International Symposium on Personal, Indoor and Mobile Radio Communications: Fundamentals and PHY Track, Sep. 2013, 5 pages.

Zhang, Shunqing, et al., "Sparse Code Multiple Access: An Energy Efficient Uplink Approach for 5G Wireless Systems," Globecom 2014—Wireless Networking Symposium, Dec. 2014, 6 pages.

International Search Report dated Oct. 25, 2016 in International Patent Application No. PCT/CN2016/090773, 4 pages.

* cited by examiner

LINK ADAPTATION IN GRANT-FREE MULTIPLE ACCESS SYSTEMS

BACKGROUND OF THE INVENTION

The present disclosure is directed to wireless communications, including grant-free transmission schemes in multiple access systems.

Wireless networks such as long-term evolution (LTE) networks often utilize shared data channels for uplink (UL). The selection of a shared data channel for uplink (UL) is typically scheduling/grant based, and the scheduling and grant mechanisms are controlled by a base station (BS) in a network. A user equipment (UE) sends an UL scheduling request to the base station. When the BS receives the scheduling request, the BS sends an UL grant to the UE indicating its UL resource allocation. The UE then transmits data on the granted resource.

The signaling resource overhead for scheduling/grant mechanisms can be quite large, especially in cases where the data transmitted is small. For example, small packet transmissions of around 20 bytes each may use scheduling/grant mechanism resources that are around 30% to 50% of the packet's size. Scheduling/grant procedures may also cause an initial delay in data transmission. There is often a minimum delay of 7-8 ms in a typical wireless network between a scheduling request being sent and the first uplink data transmission.

SUMMARY

In one embodiment, a method is provided that includes determining an amount of resource overloading for a contention transmission unit (CTU) access region associated with a grant-free uplink transmission scheme in a multiple access system, determining a modulation and coding scheme (MCS) limit indicating a maximum MCS level for the CTU access region based on the amount of resource overloading, and sending the MCS limit to a plurality of user equipments (UEs) associated with the CTU access region.

In another embodiment, a base station is provided that includes a processor and a computer readable storage medium having instructions stored thereon for execution by the processor. The instructions configure the processor to determine an amount of resource overloading for a contention transmission unit (CTU) access region associated with a grant-free uplink transmission scheme in a multiple access system, determine a modulation and coding scheme (MCS) limit indicating a maximum MCS level for the CTU access region based on the amount of resource overloading, and send the MCS limit to a plurality of user equipments (UEs) associated with the CTU access region.

In another embodiment, a method is provided that includes receiving from a base station a modulation and coding scheme (MCS) limit for a contention transmission unit (CTU) access region associated with a grant-free uplink transmission scheme in a multiple access system, determining at a first user equipment (UE) a first MCS index within the MCS limit, and sending a first uplink transmission to the base station using a CTU in the first CTU access region. The first uplink transmission includes user data and the first MCS index determined at the first UE.

In another embodiment, a user equipment (UE) is provided that includes a processor, and a computer readable storage medium having instructions stored thereon for execution by the processor. The instructions configure the processor to receive from a base station a modulation and coding scheme (MCS) limit for a contention transmission unit (CTU) access region associated with a grant-free uplink transmission scheme in a multiple access system, determine at the UE a first MCS index within the MCS limit, and send a first uplink transmission to the base station using a CTU in the first CTU access region. The first uplink transmission includes user data and the first MCS index determined at the first UE.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

A wireless communication system and associated methods of operation are described that provide link adaptation for grant-free uplink transmission schemes in multiple access architectures. Quasi-orthogonal multiple access schemes such as low density signature orthogonal frequency-division multiplexing (LDS-OFDM) and sparse code multiple access (SCMA) systems allow resource overloading between different user equipment (UE). Grant-free uplink transmission permits user equipment to send uplink transmissions without a base station (BS) allocating resources to request/grant mechanisms. Individual UEs contend for and access uplink resources without a request/grant mechanism. This provides a reduction in the total amount of network overhead resources for request/grant signaling.

Link adaptation is provided to permit the UEs to adapt grant-free uplink transmissions based on local parameters such as channel state information, path loss, and/or traffic characteristics. This provides improvements in spectrum efficiency. The UEs utilize individual link adaptations rather than pre-defined link definitions as may be typified by traditional grant-free communications. Moreover, the base station may specify MCS limits based on system loading. This may lead to increases in the number of concurrent access UEs as well as the system capacity. The grant-free transmission scheme with link adaptation may be defined by a base station or may be defined by a wireless standard.

A base station is disclosed that implements a grant-free transmission scheme with link adaptation. The base station is configured to determine UE density and service requirements such as link budget, coverage area, etc. Based on these parameters, the base station determines an appropriate overloading of resources within the grant-free scheme to meet the required parameters. The base station may determine a number of resources such as contention transmission units (CTUs) to allocate for a CTU access region. Based on cell loading or other parameters, the base station determines a maximum MCS level for use by UEs in the CTU access region. The maximum MCS level is broadcast to UEs as an MCS limit. The UEs select an MCS level within the MCS limit based on local conditions for uplink transmissions to the base station. The UE provides an MCS index in the uplink transmission that indicates the MCS level used for transmitting data in the uplink. The base station accesses the MCS index to utilize the appropriate MCS level when decoding the uplink transmission.

Figure 1:
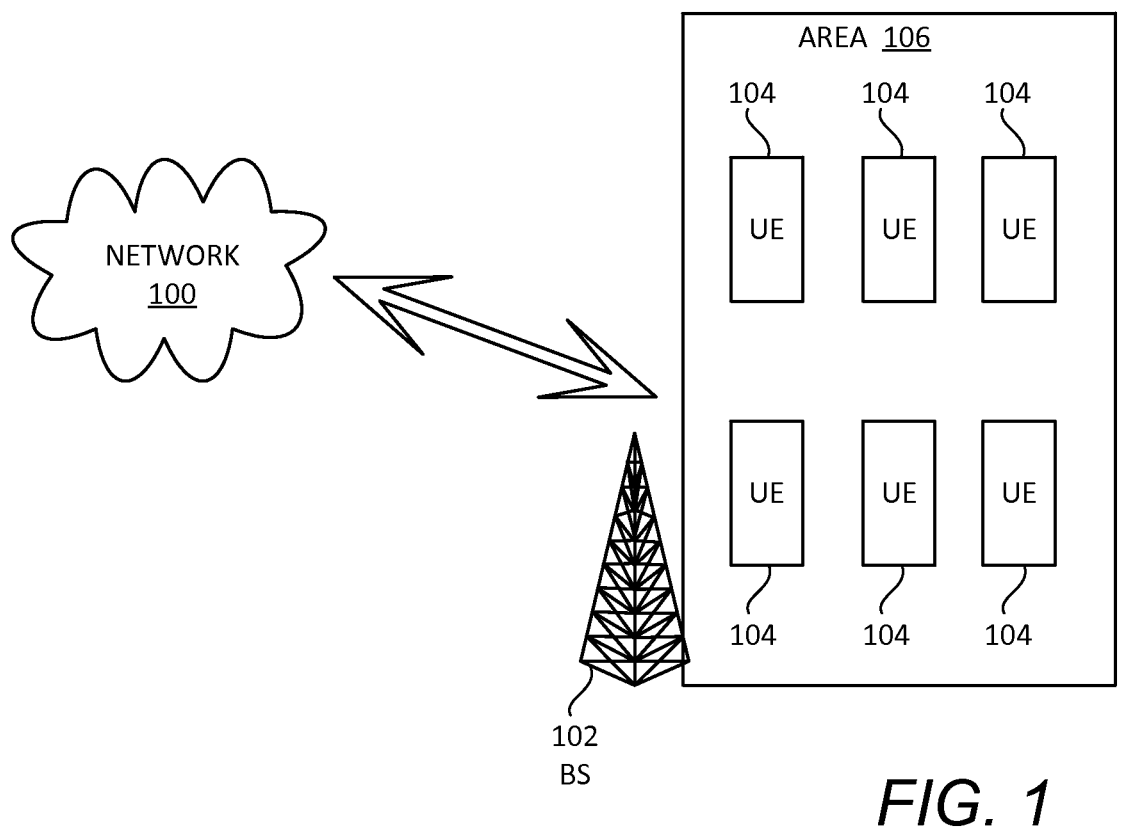
FIG. 1 is a block diagram depicting an example of a network in accordance with the disclosed technology.

FIG. 1 illustrates a block diagram of a network 100 according to various embodiments. A base station (BS) 102 manages uplink and downlink communications for various UEs 104 within its coverage area 106. BS 102 may alternatively be referred to as a cell tower or site, macrocell, microcell, a base transceiver station (BTS), a NodeB, an eNodeB or eNB, an access network, and the like. BS 102 may support transmissions for multiple cellular carriers concurrently. BS 102 implements a grant-free uplink transmission scheme, wherein contention transmission unit (CTU) access regions are defined so that UEs 104 may contend for and access uplink resources without a request/grant mechanism. The grant-free uplink transmission scheme may be defined by the BS, or it may be set in a wireless standard (e.g., 3GPP). UEs 104 may be mapped to various CTU access regions to avoid collision (i.e., when two or more UEs attempt to transmit data on the same uplink resource). However, if collision occurs, UEs 104 may resolve collisions using an asynchronous HARQ (hybrid automatic repeat request) method. BS 102 blindly (i.e., without explicit signaling) detects active UEs and decodes received uplink transmissions.

Under this scheme, UEs 104 may send uplink transmissions without the BS allocating resources to request/grant mechanisms. Therefore, total network overhead resources are saved. Furthermore, this system allows for time savings during uplink by bypassing the request/grant scheme. Although only one BS 102 and six UEs 104 are illustrated in FIG. 1, a typical network may include multiple BS's each covering transmissions from a varying multitude of UEs in its geographic coverage area.

Network 100 uses various high level signaling mechanisms to enable and configure grant-free transmissions. UEs 104 capable of grant-free transmissions may signal this capability to BS 102. This allows BS 102 to support both grant-free transmissions and traditional signal/grant transmissions (e.g., for older UE models) simultaneously. The relevant UEs may signal this capability by, for example, RRC (radio resource control) signaling defined in the 3GPP (third generation partnership project) standard (e.g., as set forth in 3GPP TS 25.331 Standard, Radio Resource Control (RRC); Protocol Specification). A new field may be added to the UE capability list in RRC signaling to indicate whether the UE supports grant-free transmissions. Alternatively, one or more existing fields can be modified or inferred in order to indicate grant-free support.

BS 102 also uses high-level signaling mechanisms (e.g., a broadcast channel or a slow signaling channel) to notify UEs 104 of information necessary to enable and configure a grant-free transmission scheme. For example, BS 102 may signal that it supports grant-free transmissions, its search space and access codes for CTU access regions, a maximum size of a signature set (i.e., the total number of signatures defined), a modulation and coding scheme (MCS) setting, and the like. Furthermore, BS 102 may update this information from time to time using, for example, a slow signaling channel (e.g., a signaling channel that only occurs in the order of hundreds of milliseconds instead of occurring in every transmission time interval (TTI)).

BS 102 implements a grant-free uplink transmission scheme. The grant-free transmission uplink scheme defines CTU access regions to enable grant-free transmissions by UEs. A CTU is a basic resource, predefined by network 100, for contention transmissions. Each CTU may be a combination of time, frequency, code-domain, and/or pilot elements. Code-domain elements may be CDMA (code division multiple access) codes, LDS (low-density signature) signatures, SCMA (sparse code multiple access) codebooks, and the like. These possible code-domain elements may be referred to generically as "signatures" hereinafter. Multiple UEs may contend for the same CTU. The size of a CTU is preset by the network and may take into account an expected transmission size, the amount of desired padding, and/or MCS levels.

A CTU access region is a time-frequency region where contention transmission occurs. The grant-free uplink transmission scheme may define multiple CTU access regions for network 100. The grant-free transmission uplink scheme may be defined by BS 102 via high level signaling (e.g., through a broadcast channel) or it may be pre-defined by a standard and implemented in UEs (e.g., in a UEs firmware). The regions may exist in one or more frequency bands (intra-band or inter-band) and may occupy the entire uplink transmission bandwidth or a portion of the total transmission bandwidth of BS 102 or a carrier supported by BS 102. A CTU access region that occupies only a portion of the bandwidth allows BS 102 to simultaneously support uplink transmissions under a traditional request/grant scheme (e.g., for older UE models that cannot support grant-free transmissions). Furthermore, BS 102 may utilize unused CTUs for scheduled transmissions under a request/grant scheme, or BS 102 may adjust the size of CTU access regions if portions of the access regions are not used for a period of time. Furthermore, the CTU access regions may frequency hop periodically. BS 102 may signal these changes in CTU access region size and frequency to UEs 104 through a slow signaling channel.

Various embodiments like that of FIG. 1 are described with respect to a specific context, namely a LTE wireless communication network. Various embodiments may also be applied, however, to other wireless networks such as a worldwide interoperability for microwave access (WiMAX) network, a global system for mobile communications (GSM) network, a universal mobile telecommunications system (UMTS) network, a code division multiple access (CDMA) network, and others.

Figure 2:
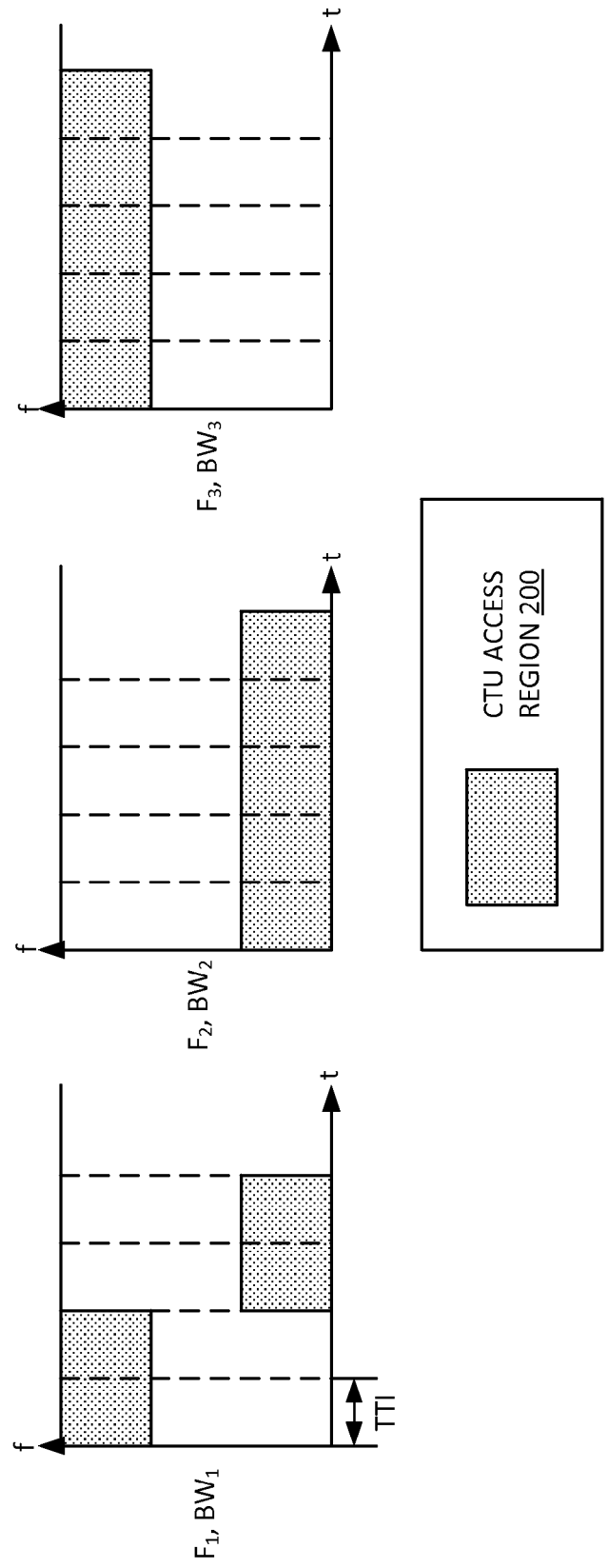
FIG. 2 is a diagram depicting an example of a configuration of contention transmission unit (CTU) access regions in accordance with the disclosed technology.

FIG. 2 illustrates an example configuration for various CTU access regions defined by BS 102. In FIG. 2, BS 102 supports transmissions for three carriers each operating at frequencies $F_1$, $F_2$ and $F_3$ with bandwidth $BW_1$, $BW_2$ and $BW_3$. FIG. 2 illustrates example CTU access regions 200 defined in all three carriers using different configurations. The configurations shown in FIG. 2 are for illustrative purposes only, and alternative CTU access region configurations may be defined in various embodiments.

Multiple CTU access regions (e.g., as illustrated in FIG. 2) allow each CTU access region to be categorized differently to provide different types of service to varying UE types. For example, the CTU access regions may be categorized to support different quality of service (QoS) levels, different UE configurations (e.g., in situations of carrier aggregation), different UE subscribed levels of service, different UE geometries, or a combination thereof. Furthermore, each CTU access region may be configured to support a different number of UEs. The size of each CTU access region may vary depending on the expected number of UEs using the region. For example, the size of a CTU access region may be based on the history of loading in the CTU access region (such as the number of UEs), UE collision probability estimations, and/or measured UE collisions over a period of time.

Figure 3:
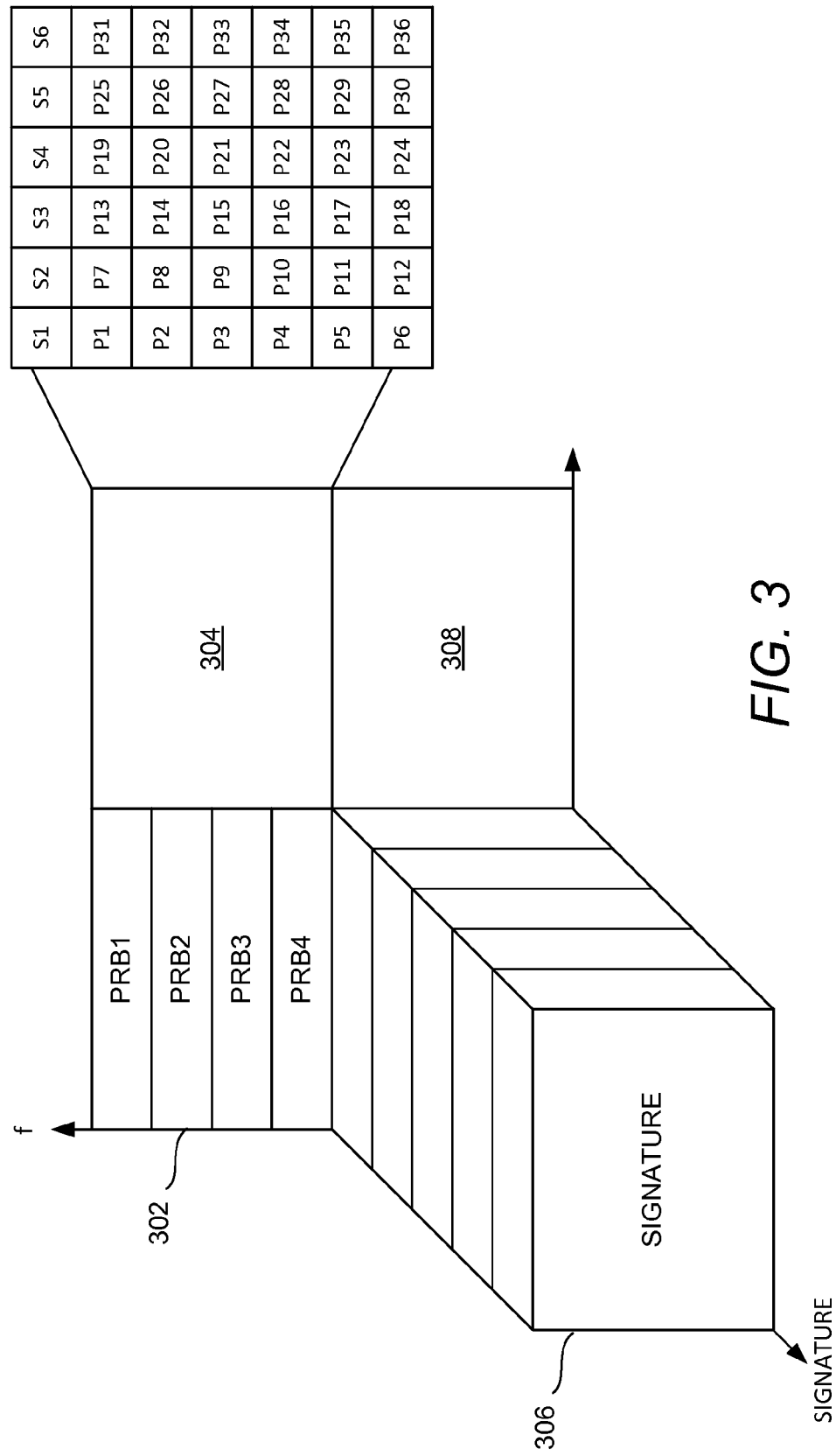
FIG. 3 is a diagram depicting an example mapping of CTUs to CTU access regions in accordance with the disclosed technology.

FIG. 3 illustrates an example CTU resource definition in various CTU access regions. FIG. 3 illustrates four CTU access regions 302-308. The available bandwidth is divided into time-frequency regions for CTU access region 302-308, with each access region 302-308 occupying a predefined number of physical resource blocks (e.g., access region 302 occupies PRBs 1-4) of bandwidth. In FIG. 3, CTUs are mapped identically to access regions 302-308, but varying views of this mapping are shown for illustrative purposes.

In FIG. 3, each CTU access region is capable of supporting up to thirty-six UEs contending for the thirty-six CTUs defined in each region. Each CTU is a combination of time, frequency, signature, and pilot. Each access region 302-308 occupies a distinct frequency-time region. These frequency-time regions are further broken down to each support six signatures ($S_1$-$S_6$) and six pilots mapped to each signature to create thirty-six total pilots ($P_1$-$P_{36}$). A pilot/signature decorrelator at BS 102 is used to detect and decode individual UE signals and transmissions.

Under this scheme different UEs conduct uplink transmissions on the same signature. Various embodiments support signature collisions (i.e., when several UEs simultaneously access the same frequency-time resources by using the same signature). While signature collisions may degrade UE performance, the transmitted information can be decoded by BS 102 using various decoding schemes (e.g., a joint message passing algorithm (JMPA) scheme as described in detail in subsequent paragraphs). Furthermore, signature collisions between two UEs do not affect the performance of other UEs. Therefore, signature collisions are not detrimental to overall system performance. Various embodiments map multiple potential UEs to the same frequency-time-signature resource so that, at each contention transmission, the system may be fully loaded.

Pilot collisions may not be supported. Similar to signature collision, pilot collision refers to cases when multiple UEs simultaneously access the same frequency-time-signature resources by using the same pilot sequence. Unlike signature collisions, however, pilot collisions may lead to irreparable results in a grant-free transmission scheme. BS 102 may be unable to decode a UEs transmission information in pilot collision scenarios because BS 102 may be unable to estimate the individual channels of UEs using the same pilot. For example, assume two UEs have the same pilot and their channels are $h_1$ and $h_2$. BS 102 can only estimate a channel of quality of $h_1+h_2$ for both UEs. Thus, the transmitted information will not be decoded correctly. Various embodiments may define a number of unique pilots (e.g. thirty-six pilots per access region in FIG. 3) depending on the number of UEs supported in the system. The specific numbers given in FIG. 3 are for illustrative purposes only, and the specific configuration of the CTU access regions and CTUs may vary depending on the network.

Various embodiments enable grant-free transmissions through the inclusion of mechanisms for collision avoidance through UE to CTU mapping/re-mapping and collision resolution through asynchronous HARQ. For a UE to successfully perform uplink transmissions in a grant-free scheme, the UE determines a CTU on which data can be sent. The UE determines the CTU it should use for transmissions based on predefined mapping rules known by both the UE (e.g., UEs 104) and the base stations (e.g., BS 102) in a network (e.g., network 100) in one embodiment. These mapping rules may be implicit (i.e., default) rules predefined for the UE (e.g. in an applicable standard or in the firmware of the UE) and/or explicit rules defined by a BS using high level signaling. For example, different mapping rules (as referred to as mapping configurations) are predefined in a wireless standard, such as 3GPP (e.g. as specified in 3GPP TS 36.213 Evolved Universal Terrestrial Radio Access (E-UTRA); Physical layer procedures), and the index of the applicable mapping configuration is signaled to a UE by the BS.

The grant-free uplink transmission scheme assigns a unique, identifying CTU index, $I_{CTU}$, to each CTU in the CTU access regions. UEs determine which CTUs to transmit on based on mapping rules for choosing an appropriate CTU index. The mapping of CTU indexes may be distributed uniformly over the available resources taking into account the size of the CTU regions over the time-frequency domain and the desire to reduce BS decoding complexity. The size of the CTU regions is taken into account so that UEs are not mapped to the same subset of available time-frequency resources.

Traditionally, grant-free uplink schemes rely on a pre-defined link definition across CTU access regions. Grant-free transmissions reduce signaling overhead and latency in an effort to efficiently use the available spectrum. The UEs do not send requests for resources to the base stations and the base stations do not send resource grants to the UEs. In order to properly decode an uplink transmission, the BS needs to utilize the appropriate MCS level that was used for the uplink. If the base station cycles through multiple MCS levels until a signal is properly decoded using the MCS from the UE, inefficiencies may be introduced. Accordingly, a pre-defined link definition is typically used to enable the base station to efficiently decode uplink transmissions using the pre-defined link definition. For example, a modulation and coding scheme may be pre-defined for use across one or more CTU access regions. Each UE utilizes the pre-defined MCS for its uplink transmissions. Because the BS does not allocate resources in advance to requesting UEs in the grant-free uplink scheme, the BS typically does not transmit link adaptation information to the UEs. Moreover, the UEs utilize pre-defined MCS levels for transmissions without considering local conditions and parameters. While utilizing a pre-defined MCS level for all transmissions may provide high reliability, the associated limitations may result in inefficient use of the frequency spectrum.

In accordance with embodiments of the disclosed technology, a grant-free uplink transmission scheme includes link adaptation to improve spectrum efficiency in grant-free transmissions. Grant-free transmissions are provided to reduce signaling latency, while link adaptation from UEs to base stations is provided to improve spectrum efficiency. The base stations are configured to determine UE density and service requirements such as link budget, coverage area, etc. Based on these parameters, a base station configures the grant-free transmission scheme with an appropriate overloading of resources to meet the required parameters.

The base station, for example, may determine a number of resources such as CTUs to allocate for a CTU access region in order to meet the cell requirements. Based on the cell loading, the base station determines a maximum MCS level that can be used by the UEs in the CTU access region. For example, in response to an increase in cell loading, the base station lowers the maximum MCS level to avoid unresolvable interference between UEs in the coverage area. In response to a decrease in cell loading, the base station increases the maximum MCS level to improve transmission rates and efficient use of the spectrum. The maximum MCS level is broadcast to UEs as an MCS limit. The UEs then select an MCS level within the MCS limit based on local conditions (such as channel quality, path loss, etc.) for uplink transmissions to the base station. The UE includes an MCS index in the uplink transmission that indicates the MCS level used for transmitting data in the uplink. The base station accesses the MCS index to utilize the appropriate MCS level for decoding the uplink transmission.

Figure 4:
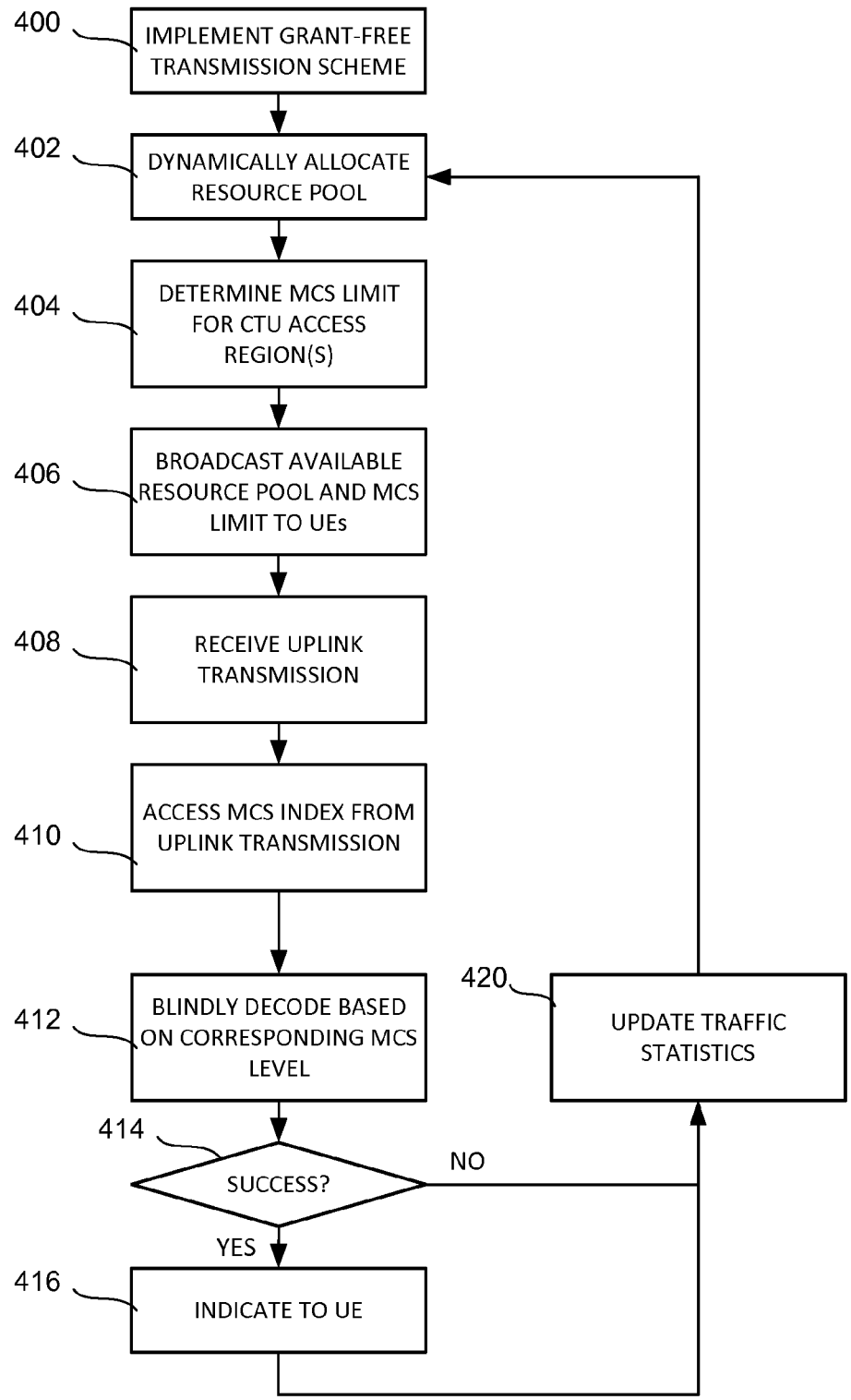
FIG. 4 is a flowchart describing operations of a base station in accordance with the disclosed technology.

FIG. 4 is a flowchart describing operations of a base station implementing a grant-free transmission scheme with link adaptation according to one embodiment. At step 400, a grant-free transmission scheme is implemented. The transmission scheme may use one or more CTU access regions, and the base station can map various CTU indexes to the CTU access regions. The CTU access regions may be pre-defined or defined by the base station. Each CTU index corresponds to a CTU on which a UE may perform grant-free transmissions. The BS may use high-level signaling (e.g., through a broadcast channel) to send information enabling grant-free transmissions. The high-level signaling can include information on the defined CTU access regions, the number of CTUs in the access regions and/or CTU index map.

It is noted that a base station need not explicitly define a grant-free uplink transmission scheme. For example, portions or all of a grant-free transmission scheme may be defined by a standard. CTU access regions may be defined by a standard, for example. The base station may map CTU indexes to the CTU access regions and transmit information to implement the grant-free transmission scheme.

At step 402, the base station dynamically allocates a resource pool for a coverage area corresponding to one or more CTU access regions. The base station determines the amount of cell loading in the coverage area at step 402 in order to allocate a number of resources in the coverage area commensurate with the loading. For example, the base station may determine a number of active UEs in the coverage area or an amount of traffic being utilized for uplink transmissions in the coverage area. After determining or estimating an amount of cell loading, the base station adapts the available physical resources to allocate the resource pool with an appropriate number of resources. The base station allocates a larger number of non-orthogonal resources in response to the cell loading increasing, and allocates a smaller number of non-orthogonal resources in response to the cell loading decreasing. Generally, the base station evenly releases/adds resources based on the overloading factor to be used. In an LDS-OFDM scheme, the base station may allocate more sparse spreading code sets across different time-frequency regions to increase the resource pool. In an SCMA scheme, the base station may allocate more SCMA code sets which can be based on different orders of constellation or constellation dimensions.

At step 404, the base station determines an MCS limit for one or more CTU access regions based on the amount of resource overloading in the CTU access region. The MCS limit indicates a maximum MCS level that can be supported in uplink transmissions to the base station by the UEs. For example, the MCS limit may be an MCS index used in a mapping of different MCS indices to different MCS levels. An allocation of more non-orthogonal resources to the resource pool results in more resource overloading within a CTU access region. As resource overloading increases, the link budget in the coverage area is lower. The base station determines the maximum MCS level that can be supported in the uplink to the base station under the current resource overloading. The base station may consider the amount of overloading as well as the capabilities of the base station to determine the maximum MCS level. In one example, multiple levels of overloading may be used within a CTU access region. A mapping of overloading rates (also referred to as overloading factors) to different MCS levels may be used. In this manner, the base station may select a maximum MCS level corresponding to the current overloading factor for the CTU access region.

In one example, the MCS level corresponds to a modulation scheme and code rate in LDS-OFDM. The link adaptation scheme utilizes a pre-defined mapping between MCS levels and modulation schemes and code rates in LDS-OFDM. In another example, the MCS level corresponds to different SCMA code book sets (based on different orders of constellation) and code rates in SCMA. The link adaptation scheme utilizes a pre-defined mapping between MCS levels and SCMA code book sets and code rate in SCMA. For various examples, the mapping can be stored at the base station as well as the UEs to determine the appropriate MCS parameters from a selected MCS level. A set of MCS indexes may be used by the base stations and UEs that indicate a corresponding MCS level. MCS levels may also be used in other multiple access systems.

At step 406, the base station broadcasts the available resource pool and MCS limit to the UEs in the coverage area. The MCS limit sets a maximum MCS level that the UEs can use for uplink transmissions using resources from the resource pool in one or more CTU access regions. The UEs select a resource such as a CTU for an uplink transmission from the available resource pool. The UEs can then select an MCS level within the MCS limit based on local parameters such as channel conditions, etc. as described hereinafter.

At step 408, the base station receives an uplink transmission from a UE in the coverage area. The uplink transmission includes data as well as control information. The control information may include a UE identifier (UE ID) to identify the UE sending the uplink transmission. At step 410, the base station accesses an MCS index included in the control information from the UE. The MCS index indicates the MCS level (within the MCS limit) used by the UE for the uplink transmission. In one example, the control information is provided in an uplink control channel such as a PUCCH in LTE.

At step 412, the base station blindly decodes the uplink transmission. The base station may use a joint message passing algorithm (JMPA) and active UE detector method in one example. The base station uses the MCS index to access a mapping to SCMA or LDS-OFDM information such as code book sets and code rates used in the uplink transmission. The base station decodes the uplink transmission using the corresponding MCS information.

At step 414, the base station determines whether the decoding was successful. If the decoding was successful, the base station indicates to the UE that decoding was successful at step 416. The base station may send an acknowledgement (e.g., ACK) at step 416 in response to successful decoding. The base station may optionally send a NACK signal in response to unsuccessful decoding if the UE ID is decoded successfully from the uplink control information.

If decoding is not successful at step 414, or after sending an indication at step 416, the base station updates traffic statistics at step 420. The base station can measure the uplink signal to noise ratio, or signal to interference plus noise ratio (SINR), associated with transmissions from individual UEs for example. The base station may monitor or develop long term statistics relating to uplink detection performance and/or probabilities of contention. The base station can use this statistical information to dynamically allocate the resource pool and/or to determine an MCS limit.

In one embodiment as described in FIG. 4, a base station includes an implementation element that implements a grant-free transmission scheme, an allocation element that dynamically allocates a resource pool, an overloading element that determines an amount of resource overloading for a first contention transmission unit (CTU) access region associated with the grant-free uplink transmission scheme, a limit setting element that determines a modulation and coding scheme (MCS) limit indicating a maximum MCS level for the first CTU access region, and a broadcast element that broadcasts the MCS limit to a plurality of user equipments (UEs) associated with the first CTU access region.

Figure 5:
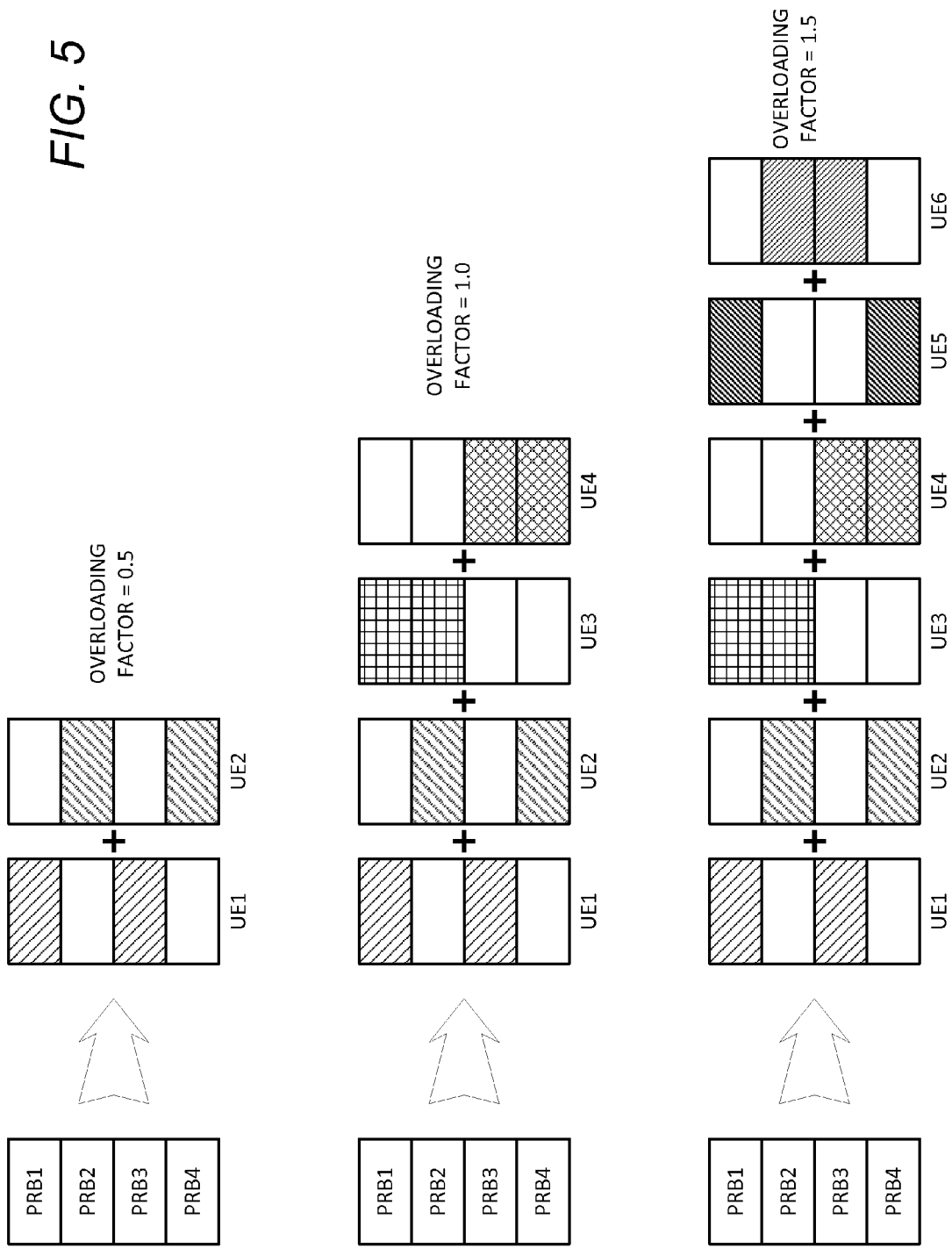
FIG. 5 is a diagram depicting an example of resource allocations in a CTU access region resulting in different overloading factors.

FIG. 5 is a block diagram describing an example of a grant-free transmission scheme and various overloading factors that may be used. FIG. 5 depicts four physical resource blocks PRB1, PRB2, PRB3, and PRB4. As also shown in FIG. 3, these four physical resource blocks may correspond to one CTU access region (e.g., 302). In FIG. 5, an SCMA scheme is described having an SCMA code length of four using four sub-carriers. Each sub-carrier may be variously overloaded to achieve different levels of resource overloading within the CTU access region. For example, the number of CTUs within the CTU access region may be varied to achieve different overloading factors. In an LDS-OFDM scheme, the base station may vary the size of a resource pool by allocating different numbers of sparse spreading code sets across the time-frequency regions. In an SCMA scheme, the base station may allocate different numbers of SCMA code sets which could be based on different orders of the SCMA constellation. It will be appreciated that the configuration in FIG. 5 is presented by way of example only. Other modulation schemes may be used as well as CTU access regions of any sizes and configuration.

The first line in FIG. 5 depicts an example of the CTU access region with an overloading factor of 0.5. The overloading factor can be determined in various ways. In one example, the overloading factor is based on the number of CTUs that are allocated to the first CTU access region and a number of active UEs. The overloading factor can be equal to the quotient of the allocated CTUs and the number of active UEs. In another example, the uplink traffic in the first CTU is used in place of the number of active UEs to determine the overloading factor. The overloading factor is equal to the quotient of the SCMA code length and the number of active UEs in another example. In FIG. 5, there are two UEs with an SCMA code length of 4 resulting in an overloading factor of 0.5. The SCMA code is a sparse code. In this case, the two UEs share the four PRBs. UE1 includes a non-zero value in PRB1 and PRB2, while UE2 includes a non-zero value in PRB2 and PRB4. In this scenario, there is no contention between the physical resource blocks by the different UEs.

The second line in FIG. 5 depicts an example of the CTU access region with an overloading factor of 1.0. In this case, with an SCMA code length of four, four UEs share the four PRBs such that the overloading factor is 1.0. UE1 includes non-zero values in PRB1 and PRB2, while UE2 includes non-zero values in PRB2 and PRB4. UE3 includes non-zero values in PRB1 and PRB2, while UE4 includes non-zero values in PRB3 and RPB4. In this scenario, there is a contention for the first PRB1 by UE1 and UE3, a contention for the second PRB2 between UE2 and UE3, a contention for the third PRB3 between UE1 and UE4, and a contention for the fourth PRB4 between UE2 and UE4. UE1 and UE3, for example, utilize different signatures represented by different cross-hatching to access PRB1 so that multiple access is provided.

The third line in FIG. 5 depicts an example of the CTU access region with an overloading factor of 1.5. In this case, with an SCMA code length of four, six UEs share the four PRBs such that each PRB is shared between three UEs. User equipment UE1-UE4 includes non-zero values in the PRBs as shown in the second line. Additionally, UE5 includes non-zero values in PRB1 and PRB4 and UE6 includes non-zero values in PRB2 and PRB3. As such there is a contention for the first PRB1 between UE1, UE3, and UE5, a contention for the second PRB2 between UE2, UE3, and UE6, a contention for the third PRB3 between UE1, UE4, and UE6, and a contention for the fourth PRB4 between UE2, UE4, and UE5. UE1, UE3, and UE5, for example, utilize different signatures (e.g, codewords) represented by different cross-hatching to access PRB1 so that multiple access is provided. The scenarios presented in FIG. 5 are provided by way of example as numerous variations of overloading factors and sub-carriers may be used.

Figure 6:
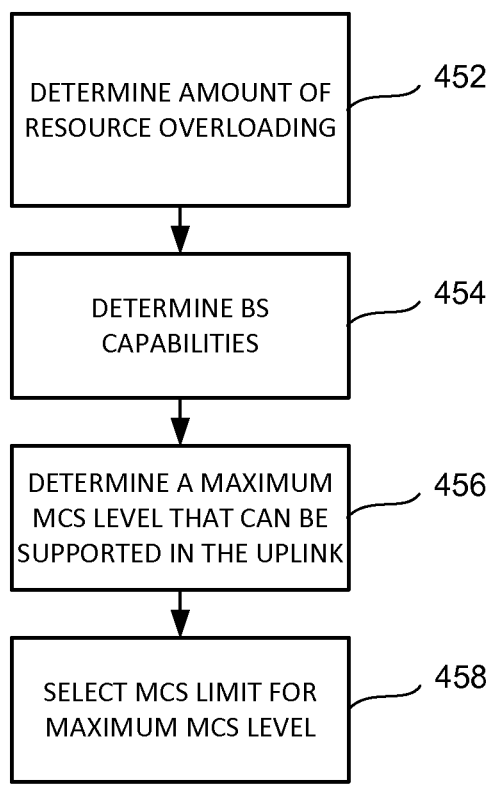
FIG. 6 is a flowchart describing a process for selecting an MCS limit by a base station in accordance with the disclosed technology.

FIG. 6 is a flowchart describing a process by a base station to set an MCS limit for accessing a CTU access region in a grant-free transmission scheme. At step 452, the base station determines an amount of resource overloading associated with the CTU access region. The base station may dynamically allocate resources to generate a resource pool by overloading the physical resource blocks. The base station may dynamically allocate CTUs to the CTU access region by adjusting the number of code book sets used in the CTU access region. The amount of resource overloading is based on the allocation of non-orthogonal resources within the CTU access region and can be determined from the overloading factor. The overloading factor is associated with the available link budget for the CTU access region. A higher loading factor leads to a lower link budget. A lower loading factor leads to a higher link budget.

At step 454, the base station determines the base station capabilities. The base station can determine its available processing capabilities and amount of resource allocation. At step 456, the base station determines a maximum MCS level that can be supported in the uplink for the CTU access region. The maximum MCS level is based on the amount of resource overloading (which affects uplink link budget) and the base station capabilities. In one example, the base station uses a mapping of overloading factors to MCS levels at step 456. The MCS level indicated by the mapping may be adjusted based on the current base station capabilities. Generally, the base station determines a higher maximum MCS level in response to a low overloading factor, and a lower maximum MCS level in response to a high overloading factor. In response to a low overloading factor, the link budget for the CTU access region is higher. A more aggressive and high performance MCS level can be used. Accordingly, the base station determines that a higher maximum MCS level can be supported. In response to a high overloading factor, the available link budget is low. Accordingly, the base station determines that a lower or more conservative MCS level can be supported. At step 456, the base station attempts to determine a maximum MCS level while ensuring that uplink communications meet a threshold success rate in one embodiment.

At step 458, the base station selects an MCS limit for broadcast to the UEs in the coverage area. The MCS limit indicates a maximum MCS level that can be used by the UEs in the CTU access region in one example. The MCS limit can be specified as an MCS index in one embodiment. A mapping or table of MCS indices to different MCS levels can be used by the UEs and base stations. For example, an index of 1-16 may be used to indicate sixteen MCS levels, with lower MCS index values corresponding to lower MCS levels. The base station and UEs may contain a mapping of each MCS index to modulation and coding values. For example, each MCS index may indicate a modulation scheme and code rates (e.g., LDS-OFDM) or different code book sets and code rates (e.g., SCMA).

Figure 7:
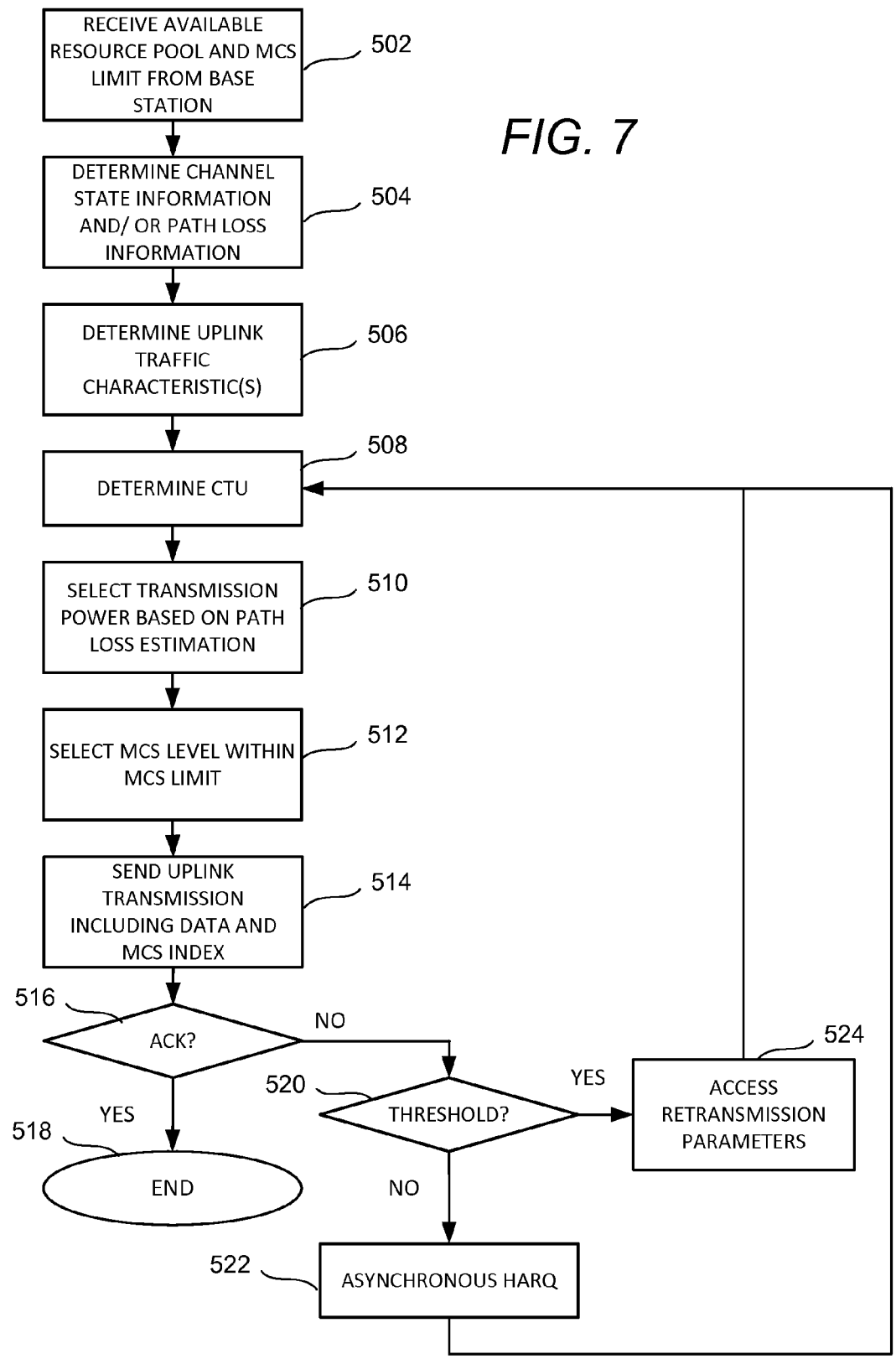
FIG. 7 is a flowchart describing operations of user equipment in accordance with the disclosed technology.

FIG. 7 is a flowchart describing operations by a UE in a grant-free transmission scheme that utilizes link adaptation in connection with uplink transmissions. At step 502, the UE receives an indication of an available resource pool and an MCS limit from a base station. The UE may receive the indication upon entering the coverage area for the base station or may receive the indication periodically as the resource pool and MCS limit are updated by the base station. The indication may identify one or more CTU access regions and the total number of CTUs allocated to each CTU access region.

At step 504, the UE determines channel state information and/or path loss information relating to the CTU access regions. For example, if the UE is in a time division duplex (TDD) mode it may determine channel station information at step 504. If the UE is in a frequency division duplex (FDD) mode, it may determine path loss information at step 504. At step 506, the UE determines uplink traffic characteristics. For example, the UE may determine the reliability and/or latency associated with the data it is to uplink to the base station.

At step 508, the UE determines a CTU on which to conduct an uplink transmission. The UE may select the CTU based on the channel state information and/or uplink traffic characteristics. In another example, the UE may select the CTU randomly or by determining a CTU index based on default mapping rules. At step 510, the UE selects a transmission power for the uplink transmission based on the path loss estimation from step 504. The path loss estimation is based on the downlink in one embodiment.

At step 512, the UE selects an MCS level within the MCS limit provided by the base station in a broadcast. Various options may be used by the UE in determining an MCS level. The UE selects the highest possible MCS level based on the channel state information and uplink traffic characteristics in one embodiment. For example, in response to channel state information that indicates a clear channel or channel with low levels of interference, the UE may select a high MCS level to provide high performance in the transmission. If the channel state information is not favorable, however, the UE may select a lower MCS level to provide a higher probability that the uplink transmission will be successful. If the uplink traffic needs high reliability, a relatively low MCS level within the MCS limit may be selected. Similarly, if the uplink traffic needs low latency, a lower MCS level may be selected.

In one embodiment, the UE utilizes a back off value to select an MCS level. For example, the UE may determine the highest possible MCS level that should be used for the uplink, then decrease the MCS level according to the back-off value. In this manner, the system may provide greater reliability by utilizing MCS levels that are below those that are possible. While lower MCS levels may lead to slower processing of individual uplinks, it may result in greater overall system performance by decreasing the number of retransmissions that are required.

For example, a UE may experience a low link budget and reach maximum transmission power (e.g., the UE is in a cell edge region or the channel condition is poor). The UE may further reduce the selected MCS level based on an actual estimated link budget.

At step 514, the UE sends an uplink transmission using the selected CTU with the selected MCS level and power transmission. The UE sends data for the uplink transmission as well as control information. The control information includes an MCS index corresponding to the MCS level selected at step 512. The MCS index is used by the base station to determine the appropriate MCS level for decoding the uplink transmission. The control information may also include UE ID information.

At step 516, the UE determines whether the uplink transmission to the base station was successful. For example, the UE may wait a predetermined amount of time for an ACK signal. If an ACK signal is received, the uplink process concludes at step 518. The UE may move on to an additional task or preparing an additional uplink transmission.

If an ACK signal is not received, the UE determines that the transmission was not successful, due to a collision for example. At step 520, the UE determines whether the number of transmission attempts is above a threshold. If the number of attempts is not above the threshold, the UE performs an asynchronous HARQ method at step 522 to resolve the collision.

If a threshold number of transmission attempts has been met, the UE can access retransmission parameters at step 524. For example, the retransmission parameters may specify settings for retransmissions. The retransmission parameters may specify that the same resource (e.g., CTU) is to be used with the same code during transmission. The retransmission parameters may alternately specify that the same resource should be used but with a different code for the retransmission. The retransmission parameters may alternately specify that a different resource should be used for the retransmission. Various thresholds may be used so that all or a portion of the different techniques may be used. For example, the UE may attempt to use the same resource with the same code until a first threshold is met, then attempt to use the same resource with a different code until a second threshold is met. In response to the second threshold being met, the UE may attempt to use a different resource.

In one embodiment as described in FIG. 7, a UE includes a receiving element that receives from a base station a modulation and coding scheme (MCS) limit associated with a first contention transmission unit (CTU) access region in a grant-free uplink transmission scheme, a determination unit that determines at a first user equipment (UE) a first MCS index within the MCS limit, and a transmission element that transmits a first uplink transmission to the base station using a CTU in the first CTU access region. The first uplink transmission includes user data and the first MCS index determined at the first UE.

Figure 8:
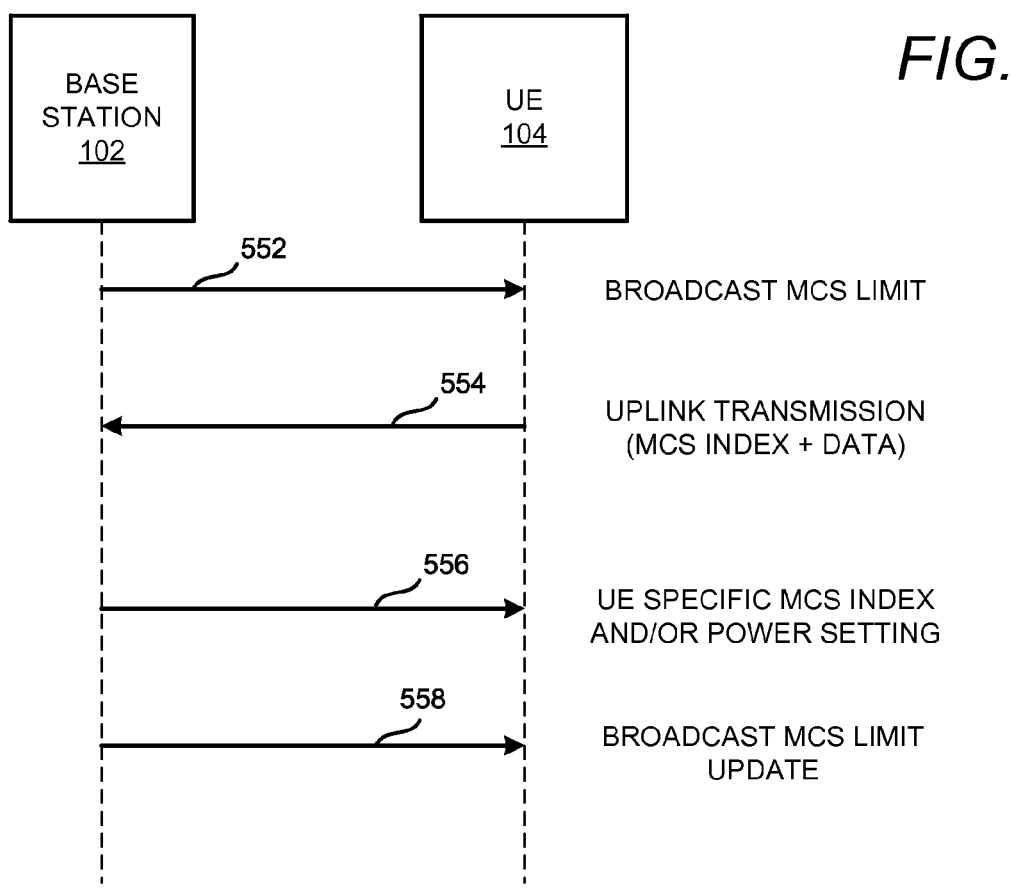
FIG. 8 is a block diagram describing an example of signaling between a base station and user equipment in accordance with the disclosed technology.

FIG. 8 is a high level block diagram describing signaling between the base station 102 and UE 104 to implement link adaptation in a grant-free transmission scheme. The base station 102 broadcasts an MCS limit to the UEs in its coverage area at 552. Different mechanisms may be used for the broadcast. The base station can use various high-level signaling such as a broadcast channel or a slow signaling channel to indicate to the UEs that grant-free transmissions can be used with link adaptation within the MCS limit.

At 554, the UE sends an uplink transmission to the base station. The uplink transmission includes a data portion containing user data for transmission and routing by the base station, as well as control information. The control information may be sent in the CTU access region using a reserved time-frequency combination as hereinafter described. The control information includes an MCS index indicating an MCS level that was used by the UE in sending the uplink transmission. The base station uses the MCS index to determine the MCS level which is used in decoding the uplink transmission.

At 556, the base station transmits UE specific settings to a UE. For example, the base station may determine a specific MCS level or transmission power setting that should be used for a specific UE. The base station may transmit these UE specific settings using a broadcast channel or slow signaling channel. Step 556 is optional and may be performed at any time. For example, the BS may monitor uplink transmissions associated with UE over time to develop specific MCS index or power settings.

At 558, the base station broadcasts an MCS limit to the UEs in its coverage area. Step 558 is performed periodically as cell loading and other conditions change. The base stations monitors traffic within the coverage area and may make adjustments to the CTU access regions and CTU allocations. Based on the adjustments or traffic characteristics, the base station may update the MCS limit and broadcast an updated MCS index for the limit at 558.

Figure 9:
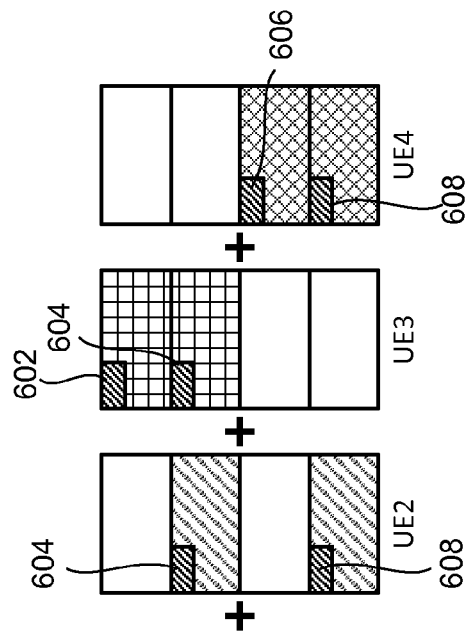
FIG. 9 is a diagram depicting an example of resource allocations in a CTU access region with reserved time-frequency resource regions for transmitting control information.

FIG. 9 is a block diagram describing an example of transmitting control information for link adaptation in a grant-free transmission scheme. FIG. 9 continues with the example of FIG. 5, depicting four physical resource blocks PRB1, PRB2, PRB3, and PRB4. A scenario is again shown with a CTU access region configured with an overloading factor of 1.0. UE1 utilizes PRB1 and PRB2, UE2 utilizes PRB2 and PRB4, UE3 utilizes PRB1 and PRB2, and UE4 utilizes PRB3 and RPB4.

A set of fixed resources 602, 604, 606, and 608 are reserved within the CTU access region. Fixed resource 602 is within a reserved portion of PRB1, fixed resource 604 is within a reserved portion of PRB2, fixed resource 606 is within a reserved portion of PRB3, and fixed resource 608 is within a reserved portion of PRB4. The fixed resources are reserved for transmitting control information including MCS information. The MCS information may include an MCS index indicating a corresponding MCS level that was used by the UE for the uplink transmission. A pre-defined MCS level is used for transmitting the fixed resources in one embodiment. In this manner, the base station can decode the MCS index from the control information using a fixed MCS level, and then decode the data based on the MCS index. An SCMA code set based on a lower order of constellation can be used for the control information, while an SCMA code set based on a higher order of constellation can be used for the data. This may provide higher reliability in determining the control information for decoding the data. No data transmissions are permitted in the reserved regions in one embodiment to avoid collision between signaling (fixed MCS) and data (dynamic MCS). Other control information such as a HARQ ID for HARQ processes may be included.

When transmitting data using a CTU, the UE transmits corresponding control information using a fixed resource within the corresponding physical resource block. In this manner, the MCS information is linked to the corresponding data by using the SCMA code sets which share the same non-zero positions. For example, UE1 transmits data in a CTU using the first physical resource block PRB1, and transmits control information for decoding the data using the fixed resource 602. Similarly, UE1 transmits data using the third physical resource block PRB3, and transmits control information using fixed resource 606. UE2 transmits data using PRB2 and corresponding control information using fixed resource 604, and transmits data using PRB4 and corresponding control information using fixed resource 608. UE3 transmits data using PRB1 and corresponding control information using fixed resource 602, and transmits data using PRB2 and corresponding control information using fixed resource 604. UE4 transmits data using PRB3 and corresponding control information using fixed resource 606, and transmits data using PRB4 and corresponding control information using fixed resource 608.

Figure 10:
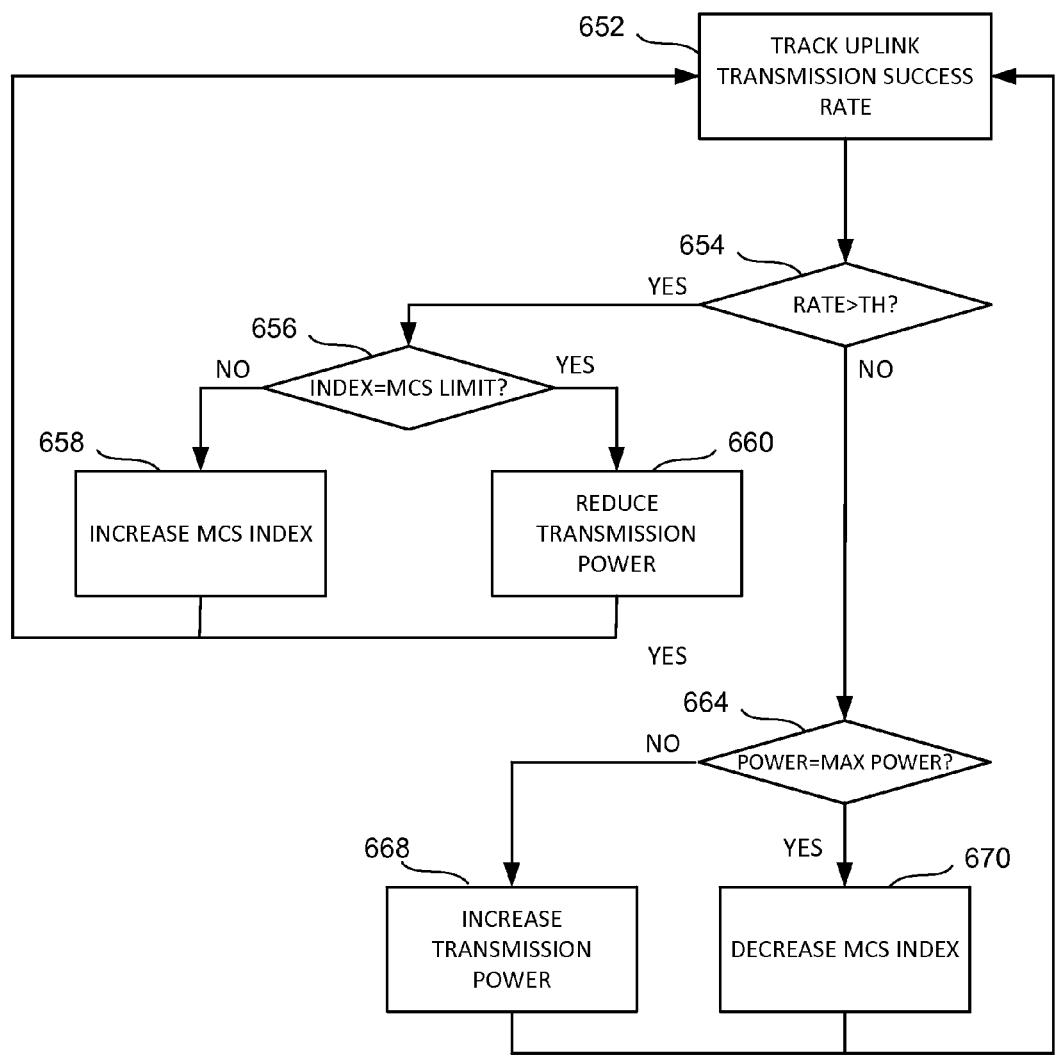
FIG. 10 is a flowchart describing open loop link adaptation by user equipment in accordance with the disclosed technology.

FIG. 10 is a flowchart describing an open loop link adaptation performed by a UE in accordance with one embodiment. At step 652, the UE tracks the uplink transmission success rate. The UE may increase a counter each time it receives an ACK signal in response to an uplink transmission, for example. The success rate can be defined as the ratio between total number of ACK signals that are received and the total number of uplink transmissions. At step 654, the UE determines whether the uplink transmission success rate is greater than a threshold TH. In response to the success rate being greater than the threshold, the UE determines at step 656 whether the current MCS index that is selected for uplink transmissions is equal to the MCS limit set by the base station. In response to the MCS index being lower than the MCS limit, the UE increases the MCS index at step 658. In response to the MCS index being at the MCS limit, the UE reduces the transmission power for uplink transmissions at step 660. The UE may decrease the transmission power using pre-defined step sizes. In this manner, the UE will increase the MCS level for uplink transmissions if its uplink transmission success rate is exceeding a specified level for example. In response to the MCS level being at the MCS limit, the UE reduces the transmission power for the uplink transmissions. In this manner, the UE may conserve power if it is achieving a minimum success rate. The UE may reset the uplink transmission success rate after making adjustments to the MCS index and/or transmission power.

In response to the uplink success rate being less than or equal to the threshold, the UE attempts to increase the rate by adjusting the transmission power and/or the MCS level. At step 664, the UE determines whether the currently selected transmission power is equal to a maximum power level that can be used. In response to the maximum transmission power not being reached, the UE increases the transmission power at step 668. A pre-defined step size can be used for increasing the transmission power until the maximum power is reached. In response to the maximum power level being reached, the UE decreases the MCS index at step 670. The UE decreases the MCS index to lower the MCS level for uplink transmissions. In this manner, the UE may increase transmission power in a first attempt to reach an acceptable success rate for uplink transmissions. If power increases do not result in an adequate success rate, the UE can decrease the MCS index so that more conservative MCS levels are used in an effort to improve transmission success.

In FIG. 10, a single threshold is used to determine whether to adjust the MCS index and/or transmission power. In one embodiment, a first and a second threshold are used where the first threshold is larger than the second threshold. If the success rate is above the first threshold, the UE increases the MCS index at step 658 or reduces the transmission power at step 660. If the success rate is less than the first threshold, the UE determines whether the success rate is lower than a second threshold. If the success rate is lower than the second threshold, the UE increases the transmission power at step 668 or decreases the MCS index at step 670. In this manner, the UE can maintain current power settings and MCS levels while the success rate is above a minimum second threshold but less than a larger threshold for triggering an increase in the MCS or decrease in transmission power.

Figure 11:
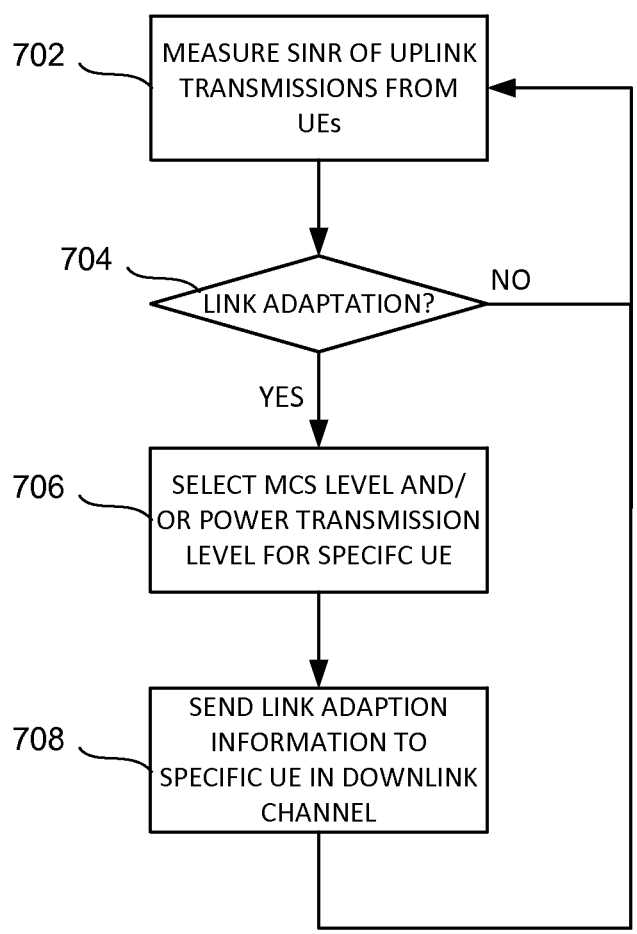
FIG. 11 is a flowchart describing a closed loop link adaptation by a base station in accordance with the disclosed technology.

FIG. 11 is a flowchart describing operations by a base station to implement a closed loop adaptation in accordance with one embodiment. At step 702, the base station measures the signal to interference plus noise ratio (SINR) for the uplink transmission from each UE. At step 704, the base station analyzes the SINR for each UE to determine whether its uplink with the base station should be adapted. If the link with the base station should be adapted, the base station selects an MCS level and/or a power transmission level for the UE at step 706. For example, the base station may determine that the UE should use a lower MCS level than the one it has selected if the SINR is below a threshold. Similarly, the base station may determine that the UE should use a higher transmission power if the SINR is below the threshold. Conversely, the base station may determine that the UE should use a higher MCS level if the SINR is above the threshold. Similarly, the base station may determine that the UE should use a lower transmission power if the SINR is above the threshold.

At step 708, the base station sends the link adaptation information to a specific UE using a downlink control channel. The base station may use a slow signaling channel in one example. For example, the base station may send an MCS index or a power control setting to a UE in a DCI format on PDCCH. After sending link adaptation information or determining that link adaptation is not necessary, the base station continues at step 702 by measuring the SINR of uplink transmissions.

Figure 12:
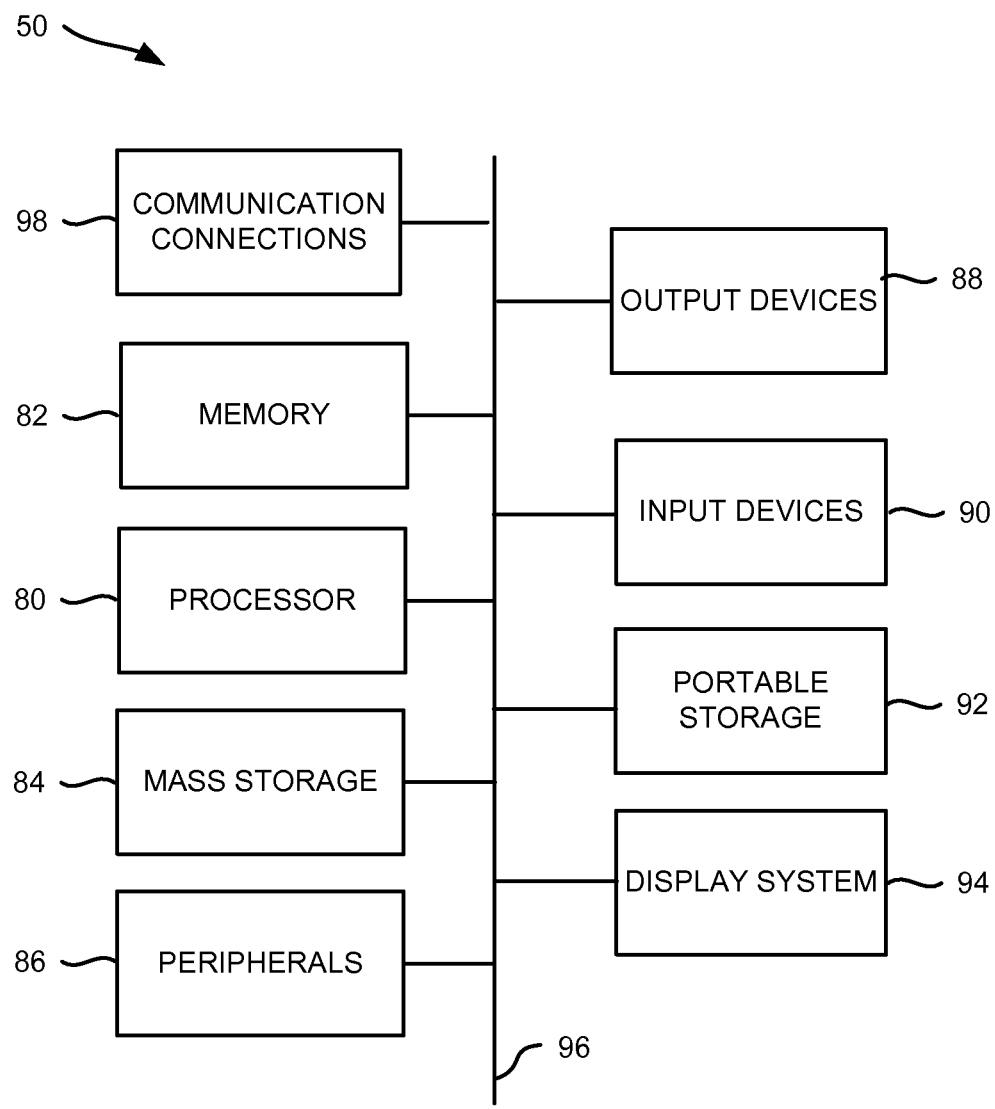
FIG. 12 is a block diagram of a computing system.

FIG. 12 is a high level block diagram of a computing system 50 which can be used to implement any of the computing devices described herein, such as UEs 104 and base stations 102. The computing system of FIG. 12 includes processor 80, memory 82, mass storage device 84, peripherals 86, output devices 88, input devices 90, portable storage 92, and display system 94. Computing devices as described herein may include fewer or additional components than those described. For example, a base station may not include peripherals 86, etc. For purposes of simplicity, the components shown in FIG. 12 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system will (optionally) have an output display system 94, which may include a video card and monitor. Output devices 88 can include speakers, printers, network interfaces, etc. System 100 may also contain communications connection(s) 98 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 12 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A method, comprising:
   determining an amount of resource overloading for a contention transmission unit (CTU) access region associated with a grant-free uplink transmission scheme in a multiple access system;
   determining a modulation and coding scheme (MCS) limit indicating a maximum MCS level for the CTU access region based on the amount of resource overloading; and
   sending the MCS limit to a plurality of user equipments (UEs) associated with the CTU access region; and
   receiving an uplink transmission from a first UE of the plurality of UEs including an MCS index based on the MCS limit.

2. The method of claim 1, further comprising:
   determining the MCS index from control information included in the uplink transmission; and
   attempting to blindly decode data in the uplink transmission using an MCS level corresponding to the MCS index from the control information.

3. The method of claim 2, wherein:
   the control information is within a reserved time-frequency region of the CTU access region; and
   said attempting to blindly decode includes blindly decoding the control information using a pre-defined MCS level.

4. The method of claim 1, further comprising:
   determining link adaptation information for a first UE based on monitoring uplink transmissions from the first UE based on the MCS limit, the link adaption information includes an adjusted MCS limit for the first UE; and
   transmitting in a control channel the link adaption information to the first UE.

5. The method of claim 4, wherein:
   the link adaption information for the first UE includes a power setting for the first UE.

6. The method of claim 1, further comprising:
   monitoring uplink transmissions from the plurality of UEs in the CTU access region to develop one or more long term statistics associated with uplink performance in the CTU access region;
   adjusting the MCS limit based on the one or more long term statistics; and
   sending an adjusted MCS limit to the plurality of UEs.

7. The method of claim 1, further comprising:
   adaptively allocating contention transmission units (CTUs) to the CTU access region based on loading in the CTU access region;
   wherein determining an amount of resource overloading includes determining an overloading factor based on a number of CTUs that are allocated to the first CTU access region and a number of active UEs.

8. The method of claim 7, further comprising:
   determining the number of CTUs to allocate to the CTU access region based on at least one of a number of active UEs or an amount of uplink traffic.

9. The method of claim 1, wherein determining an MCS limit comprises:
   selecting a first MCS limit in response to a first overloading factor and a second MCS limit in response to a second overloading factor that is higher than the first overloading factor;
   wherein the first MCS limit corresponds to a first MCS level that is higher than a second MCS level corresponding to the second MCS limit.

10. A base station, comprising:
    a processor; and
    a computer readable storage medium having instructions stored thereon for execution by the processor, wherein the instructions configure the processor to:
    determine an amount of resource overloading for a contention transmission unit (CTU) access region associated with a grant-free uplink transmission scheme in a multiple access system;

determine a modulation and coding scheme (MCS) limit indicating a maximum MCS level for the CTU access region based on the amount of resource overloading;
send the MCS limit to a plurality of user equipments (UEs) associated with the CTU access region; and
receive an uplink transmission from a first UE of the plurality of UEs including an MCS index based on the MCS limit.

11. The base station of claim 10, wherein the instructions further configure the processor to:
determine the MCS index from control information included in the uplink transmission; and
attempt to blindly decode data in the uplink transmission using an MCS level corresponding to the MCS index from the control information.

12. The base station of claim 10, wherein the instructions further configure the processor to:
measure a signal to interference plus noise ratio (SINR) for one or more of the plurality of UEs;
determine link adaptation information for a first UE of the plurality of UEs based on the SINR associated with the first UE, the link adaptation information including an adjusted MCS limit for the first UE; and
transmit in a control channel the link adaption information to the first UE.

13. The base station of claim 10, wherein the instructions further configure the processor to:
monitor uplink transmissions from the plurality of UEs in the CTU access region to develop one or more long term statistics associated with uplink performance in the CTU access region;
adjust the MCS limit based on the one or more long term statistics; and
send an adjusted MCS limit to the plurality of UEs.

14. The base station of claim 10, wherein:
the multiple access system includes sparse code multiple access (SCMA) system;
the instructions further configure the processor to map a plurality of MCS indices to a plurality of SCMA code book sets and code rates; and
the maximum MCS level corresponds to one of the SCMA code book sets and code rates.

15. The base station of claim 10, wherein:
the multiple access system includes low density signature orthogonal frequency divisional multiplexing (LDS-OFDM) system;
the instructions further configure the processor to map a plurality of MCS indices to a plurality of modulation schemes and code rates in LDS-OFDM system; and
the maximum MCS level corresponds to one of the plurality of modulation schemes and code rates.

16. The base station of claim 11, wherein:
the control information is within a reserved time-frequency region of the CTU access region; and
the instructions further configure the processor to attempt to blindly decode the control information included in the uplink transmission using a pre-defined MCS level.

17. A method, comprising:
determining an amount of resource overloading for a contention transmission unit (CTU) access region associated with a grant-free uplink transmission scheme in a multiple access system;
determining a modulation and coding scheme (MCS) limit indicating a maximum MCS level for the CTU access region based on the amount of resource overloading;
sending the MCS limit to a plurality of user equipments (UEs) associated with the CTU access region; and
adaptively allocating contention transmission units (CTUs) to the CTU access region based on loading in the CTU access region;
wherein determining an amount of resource overloading includes determining an overloading factor based on a number of CTUs that are allocated to the first CTU access region and a number of active UEs.

18. The method of claim 17, further comprising:
determining the number of CTUs to allocate to the CTU access region based on at least one of a number of active UEs or an amount of uplink traffic.

19. The method of claim 17, further comprising:
receiving an uplink transmission from a first UE of the plurality of UEs using a CTU;
determining an MCS index from control information included in the uplink transmission; and
attempting to blindly decode data in the uplink transmission using an MCS level corresponding to the MCS index from the control information.

20. The method of claim 19, wherein:
the control information is within a reserved time-frequency region of the CTU access region; and
said attempting to blindly decode includes blindly decoding the control information using a pre-defined MCS level.

21. The method of claim 17, further comprising:
determining link adaptation information for a first UE based on monitoring uplink transmissions from the first UE based on the MCS limit, the link adaption information includes an adjusted MCS limit for the first UE; and
transmitting in a control channel the link adaption information to the first UE.

22. The method of claim 17, further comprising:
monitoring uplink transmissions from the plurality of UEs in the CTU access region to develop one or more long term statistics associated with uplink performance in the CTU access region;
adjusting the MCS limit based on the one or more long term statistics; and
sending an adjusted MCS limit to the plurality of UEs.

23. A base station, comprising:
a processor; and
a computer readable storage medium having instructions stored thereon for execution by the processor, wherein the instructions configure the processor to:
determine an amount of resource overloading for a contention transmission unit (CTU) access region associated with a grant-free uplink transmission scheme in a multiple access system;
determine a modulation and coding scheme (MCS) limit indicating a maximum MCS level for the CTU access region based on the amount of resource overloading; and
send the MCS limit to a plurality of user equipments (UEs) associated with the CTU access region;
wherein the instructions configure to processor to determine an MCS limit by selecting a first MCS limit in response to a first overloading factor and a second MCS limit in response to a second overloading factor that is higher than the first overloading factor;
wherein the first MCS limit corresponds to a first MCS level that is higher than a second MCS level corresponding to the second MCS limit.

24. The base station of claim 23, wherein the instructions further configure the processor to:
- receive an uplink transmission from a first UE of the plurality of UEs using a CTU;
- attempt to blindly decode control information included in the uplink transmission using a pre-defined MCS level;
- determine an MCS index from the control information included in the uplink transmission; and
- attempt to blindly decode data in the uplink transmission using an MCS level corresponding to the MCS index from the control information;
- wherein the control information is within a reserved time-frequency region of the CTU access region.

25. The base station of claim 23, wherein the instructions further configure the processor to:
- measure a signal to interference plus noise ratio (SINR) for one or more of the plurality of UEs;
- determine link adaptation information for a first UE of the plurality of UEs based on the SINR associated with the first UE, the link adaptation information including an adjusted MCS limit for the first UE; and
- transmit in a control channel the link adaption information to the first UE.

26. The base station of claim 23, wherein the instructions further configure the processor to:
- monitor uplink transmissions from the plurality of UEs in the CTU access region to develop one or more long term statistics associated with uplink performance in the CTU access region;
- adjust the MCS limit based on the one or more long term statistics; and
- send an adjusted MCS limit to the plurality of UEs.

27. The base station of claim 23, wherein:
- the multiple access system includes sparse code multiple access (SCMA) system;
- the instructions further configure the processor to map a plurality of MCS indices to a plurality of SCMA code book sets and code rates; and
- the maximum MCS level corresponds to one of the SCMA code book sets and code rates.

28. The base station of claim 23, wherein:
- the multiple access system includes low density signature orthogonal frequency divisional multiplexing (LDS-OFDM) system;
- the instructions further configure the processor to map a plurality of MCS indices to a plurality of modulation schemes and code rates in LDS-OFDM system; and
- the maximum MCS level corresponds to one of the plurality of modulation schemes and code rates.

* * * * *